United States Patent [19]

Russell

[11] 4,068,265
[45] Jan. 10, 1978

[54] METHOD AND APPARATUS FOR SAMPLING AND REPRODUCING TELEVISION INFORMATION

[75] Inventor: James T. Russell, Richland, Wash.

[73] Assignee: Eli S. Jacobs, New York, N.Y.

[21] Appl. No.: 526,453

[22] Filed: Nov. 25, 1974

[51] Int. Cl.² .............................................. H04N 7/12
[52] U.S. Cl. .................................... 358/133; 358/136; 358/138; 358/141
[58] Field of Search ................. 178/DIG. 3, DIG. 6, 178/6.8; 358/11, 12, 13, 14, 133, 136, 138, 141

[56] References Cited

U.S. PATENT DOCUMENTS 2,921,124  1/1960  Graham ......................... 178/DIG. 3
3,848,083  11/1974  Townsend ................................ 178/6

Primary Examiner—Benedict V. Safourek
Assistant Examiner—Edward L. Coles
Attorney, Agent, or Firm—Klarquist, Sparkman, Campbell, Leigh, Hall & Whinston

[57] ABSTRACT

The effective resolution of a TV presentation reproduced from digitally encoded samples is improved by shifting the sampling points back and forth at a relatively rapid rate. Alternate lines of the original television raster are sampled at shifted points, wherein the shift is less than the sampling interval and suitably one half the sampling interval. Since a TV raster includes an odd number of horizontal lines, a particular line location on the reproduced raster will be formed of samples which shift back and forth at one half the TV frame rate, i.e. 15 cycles per second.

9 Claims, 5 Drawing Figures

METHOD AND APPARATUS FOR SAMPLING AND REPRODUCING TELEVISION INFORMATION

BACKGROUND OF THE INVENTION

The present invention relates to sampling of television signals and particularly to a method and apparatus for providing a sampled television signal with enhanced apparent resolution.

Systems are known wherein an analog television signal from a TV camera or other program source is sampled at many points along each horizontal raster line and wherein each sample is converted to a digital value by an analog to digital converter. The output of the converter is sent through a transmission channel which may comprise a broadcast transmitter, coaxial cable, or the like. At the receiving end of the channel, the digital information is reconverted to analog form for reconstructing the original television signal for presentation.

The effective resolution of the reconstructed picture will depend upon the number of samples per TV line. Thus, the fewer the samples, the poorer the resolution will be. The sampling rate is frequently limited by constraints of the communications channel resulting in poorer resolution than would be desired for the system. That is, the digital bit rate resulting from a given sampling rate is limited by the bandwidth of the transmitting cable or the like.

SUMMARY OF THE INVENTION

According to the present invention, the apparent resolution of a television image reconstructed from samples of the original signal is improved by shifting the sampling points back and forth by less than the spacing between sampling points and at a rate faster than would produce perceptible flicker. In the preferred embodiment according to the present invention, the sampling points are shifted back and forth on alternate scanning lines or horizontal lines of the raster field wherein the shift is less than the spacing between samples, e.g. one half the spacing. The raster is reproduced by positioning samples on a shifted line adjacent locations between samples on a non-shifted line. Since the samples on alternate lines are shifted, and since a raster frame comprises an odd number of horizontal lines, a given line position on the face of the reproducing cathode ray tube will appear to be formed of samples shifted back and forth in time at half the TV frame rate. Thus, a selected line on a reproduced raster will be formed from non-delayed samples during a given frame and delayed samples during the following frame and so on. The resultant perceived resolution is found to be significantly increased above the perceived resolution for sampled TV reproduction not employing the shifting method according to the present invention. The picture quality is thus improved without an increase in the bandwidth of the system, while the cost in circuit complexity to incorporate the method according to the present invention is relatively small. The foregoing manner of shifting the sampling points also has an advantage in that the shifting of the sampling points is synchronized at the receiving or reproduction end of the system in an uncomplicated manner.

In the present system, the sampling period can be about twice as large as the desired apparent resolution. Thus, the same information can be transmitted with lower bandwidth capability equipment. With a comparatively lower overall sampling rate, the noise integration time is longer and hence noise is less troublesome in the reproduction of the information.

It is accordingly an object of the present invention to provide improved method and apparatus for sampling raster signal information.

It is another object of the present invention to provide an improved method and apparatus for sampling and reproducing television information wherein the perceived resolution in the resulting image is significantly increased for a given bandwidth signal coupling.

It is another object of the present invention to provide an improved method and apparatus for sampling and reproducing a television signal having reduced noise error.

It is a further object of the present invention to provide an improved method and apparatus for sampling and reproducing a television signal having enhanced resolution and less noise and which is economical in its implementation.

It is a further object of the present invention to provide an improved method and apparatus for sampling and reproducing television signals having enhanced perceived resolution brought about by shifting the sampling points wherein the synchronization of sampling and reproducing equipment is facilitated.

It is a further object of the present invention to provide an improved method and apparatus for sampling, recording, and reproducing a television signal.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
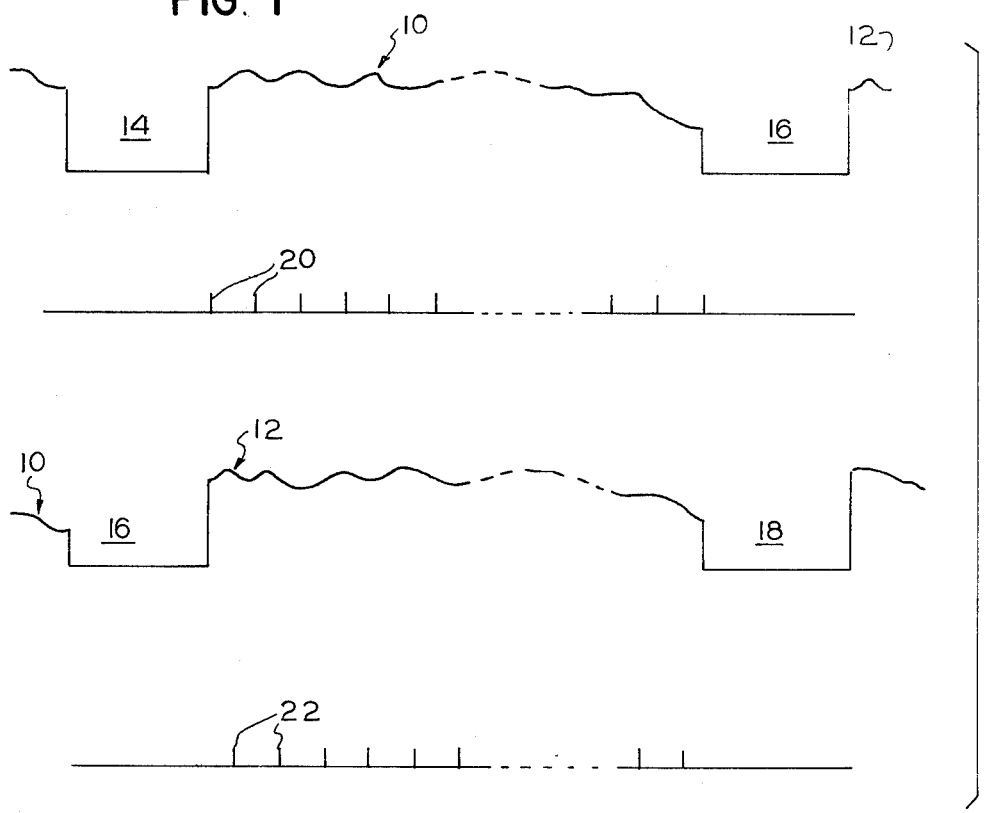
FIG. 1 is a waveform diagram illustrating the sampling of successive lines of video information according to the present invention.

Referring to the drawings and particularly to FIG. 1, television signals 10 and 12 represent a video information for successive "lines" in one field of a television raster signal, while 14, 16 and 18 represent successive horizontal blanking intervals. The two lines are consecutive parts of the same signal and are here juxtaposed for ease in examining the time of occurrence of certain events. According to the present invention, the video information is periodically sampled at many points along each TV horizontal line, with the sample initiating signals being represented at 20 in the case of line signal 10, and at 22 in the case of line signal 12. The samples are digitally encoded, according to a preferred embodiment of the present invention, and recorded or in some other manner transferred to another location for reproduction. The sampling rate is limited by constraints of the communications channel, that is the digital bit rate resulting from a given sampling rate is limited by the bandwidth of the transmission cable, or the bandwidth or bit density limits of a recording medium employed in recording the signal.

Figure 2:
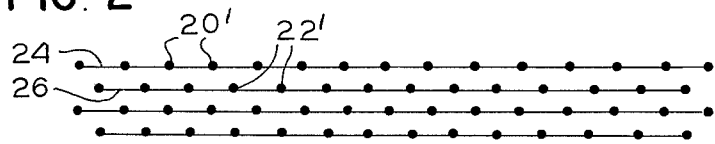
FIG. 2 is a diagrammatic representation of a portion of a TV raster illustrating sampling and reproduction points according to the present invention.

According to the present invention, the effective resolution of the television image when reproduced is significantly improved beyond what would be expected when considering the aforementioned constraints. The improvement in perceived resolution is in effect produced by shifting sampling points back and forth at a fairly rapid rate, where the size of the shift is less than the normal spacing between sampling points. For example, the size of the shift is desirably one half the spacing between sampling points. According to the preferred embodiment of the present invention, this sample shifting is accomplished by shifting the sampling points between alternate raster lines of the same field with the sample initiating signals 22 being shifted to the right or delayed by approximately one half the sampling interval or spacing between sample initiating signal pulses 20. The sampling interval or spacing between successive signal pulses 22 and 20 is the same and the delayed positioning of signal pulses 22 is brought about by delaying sampling signals for alternate raster lines as will hereinafter more fully appear. A portion of a sampled raster is illustrated in FIG. 2 wherein successive lines in a given field are illustrated at 24 and 26 respectively while sampling points thereupon are indicated respectively at 20' and 22'. The raster field when subsequently reproduced has substantially the same organization with samples 22' forming raster line 26 being located in juxtaposed relation opposite locations in between samples 20' on raster line 24. A television system employing a standard odd number of lines in a TV raster, e.g. 525 lines, is contemplated according to the present invention. Consequently, a particular sampling point on a particular line on the television reproduction screen will appear to shift back and forth by one half the sampling interval in successive raster presentations. That is, if the alternate line shifting back and forth of the sampling points continues successively through successive rasters, then a given line in a given raster (say the third line of a raster) will appear to be sampled at poits 20' during a given frame, but during the next frame the same line (say the third line of the raster) will appear to be sampled at locations 22'. A particular sampling point on a particular line will shift back and forth by one half of the sampling interval at one half the TV frame rate, i.e. at 15 cycles per second. As a result, the sampling points are shifted horizontally at a rapid rate and the eye of the observer perceives a significant increase in apparent resolution, but without any notice of flicker. Moreover, since the actual sampling period is longer than the apparent sampling period, the noise integration time is longer and hence there is less noise error on the reproduced TV image.

Figure 3:
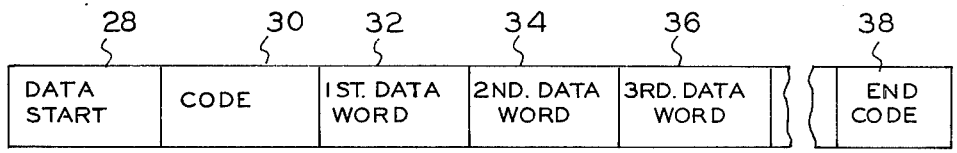
FIG. 3 is a diagram illustrating a typical digitally encoded line of television information according to the present invention.

FIG. 3 illustrates diagrammatically the digital coding of a typical raster line which is headed by a data start indication 28 timed from the horizontal blanking interval followed by a digital code 30 which is indicative of whether the line is odd or even, i.e. whether the transmitted information pertains to delayed sample points 22' or non-delayed sample points 20'. After the code follows a plurality of data words 32, 34, 36, etc., which are suitably binary encodings for each successive sample. As will be appreciated, a large number of samples and corresponding data words occur for each line, e.g. approximately 370 samples in the case of a particular embodiment. The line ends with an end code 38, which may comprise either an end of line code for initiating horizontal retrace, or an end of field code for initiating vertical retrace. These codes thus convey horizontal and vertical sync information.

Figure 4:
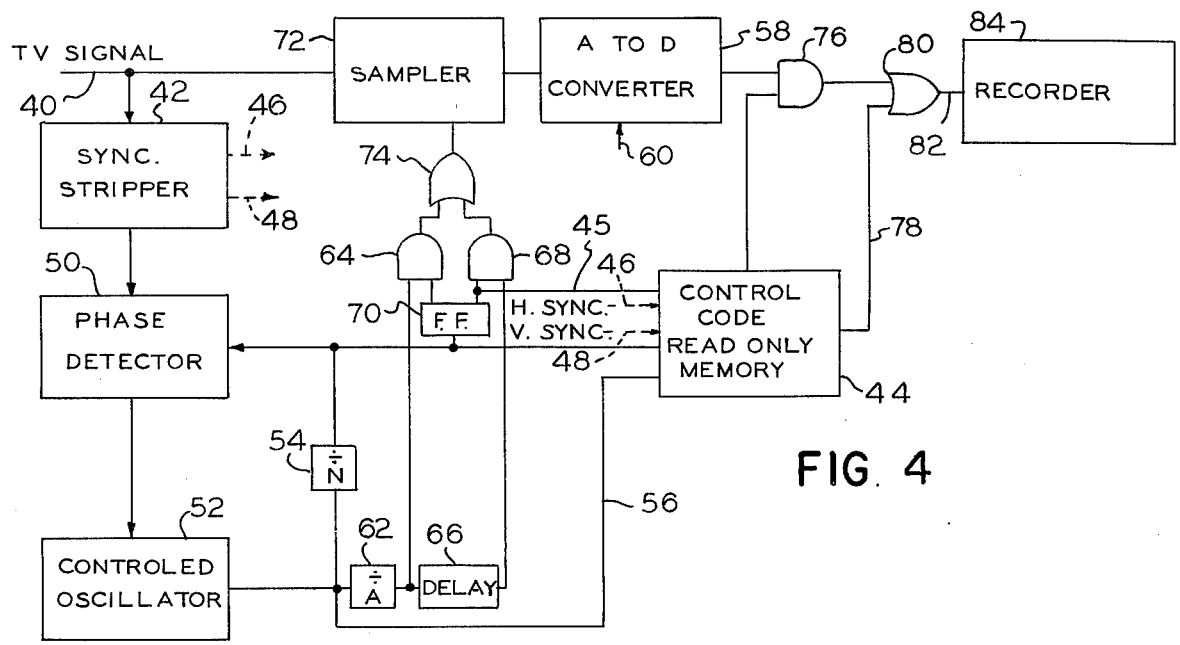
FIG. 4 is a block diagram of a sampling, digitally encoding and transmitting or recording apparatus according to the present invention.

Referring now to FIG. 4, illustrating circuitry in block diagram form for sampling and encoding TV signal information, a TV signal is received on line 40 which is coupled to sync stripper 42 for providing horizontal and vertical sync information to control code read only memory 44 via coupling means 46 and 48. Sync stripper 42 also provides a horizontal sync pulse output to phase detector 50 wherein the phase of this signal is compared with the output of controlled oscillator 52 divided by N in dividing or counting circuit 54, N being the number of digital bits per TV line. Controlled oscillator 52 is designed to operate at a bit frequency which is N times the horizontal frequency, and phase detector 50, by comparing the divided down output of the oscillator with the horizontal sync, functions to control the frequency of the oscillator. The output of the oscillator is applied for synchronizing control code read only memory 44 via line 56, and analog to digital converter 58 via line 60. The output of controlled oscillator 52 is also coupled by way of dividing circuit or counter 62 to and-gate 64, as well as to delay means 66 interposed between the divider 62 and and-gate 68. The dividing ratio, A, of divider 62 is the number of bits per digital word individually representative of a given sample. Remaining inputs for and-gates 64 and 68 are provided from opposite state outputs of flip-flop 70 toggled by the output of divider 54. Flip-flop 70 toggles with each horizontal line so that gates 64 and 68 are alternately enabled to provide outputs coincident with the output of oscillator 52 divided by A. Thus, assuming and-gate 64 is being energized from flip-flop 70, gate 64 will then provide an output every A pulses produced by oscillator 52. The output of and-gate 64 is applied to sampler 72 via or-gate 74 causing a sample of the TV signal to be coupled to A to D converter 58 where the sample is converted to a digital representation of the amplitude value of the TV signal video at that point. The outputs from gate 74 at this time are represented at 20 in FIG. 1. Now, during the next horizontal line, flip-flop 70 will be toggled to its opposite state since it receives its toggling input from divider 54 which is arranged to provide alternate outputs with alternate horizontal lines. Then, and-gate 68 will be enabled and will receive the output of oscillator 52 divided by A and delayed by delay means 66, which is suitably arranged to have a delay of one half the length of the sampling interval or one half the length or a word produced by A to D converter 58. Because of the delay, and-gate 68 will operate sampler 72 via or-gate 74 at times delayed by one half the sampling period, with the output of gate 74 then comprising pulses 22 in FIG. 1. Therefore, the words produced by A to D converter 58 will comprise the digitally encoded value of the TV signal at times corresponding to pulses 22.

Control code read only memory 44 receives TV sync pulses, the output of divider 54 and the output of flip-flop 70 on line 45 indicative of occurrence of delayed sampling. Control code read only memory 44 is adapted to insert the data start information 28, the code 30, indicating whether the line comprises delayed or non-delayed samples, and the end code 38 which may indicate an end of line, end of frame, etc. Control codes indicative of these various factors are stored in the read only memory and the stream of data is interrupted by and-gate 76, normally enabled from the memory, when such a control code is to be inserted. The control codes are coupled via line 78, which, together with the output of and-gate 76 provide inputs to or-gate 80 driving output lead 82. In the specific embodiment, output lead 82 is connected to a digital recorder 84 adapted for storing the television information for read out at a later time. Such a digital recorder is, for example, set forth and claimed in my U.S. Pat. No. 3,501,586 granted Mar. 17, 1970. Alternatively, output lead 82 may be coupled to a transmission line for coupling the digital word signals from one location to another, wherein such transmission or the recorder may be limited in bandwidth.

Figure 5:
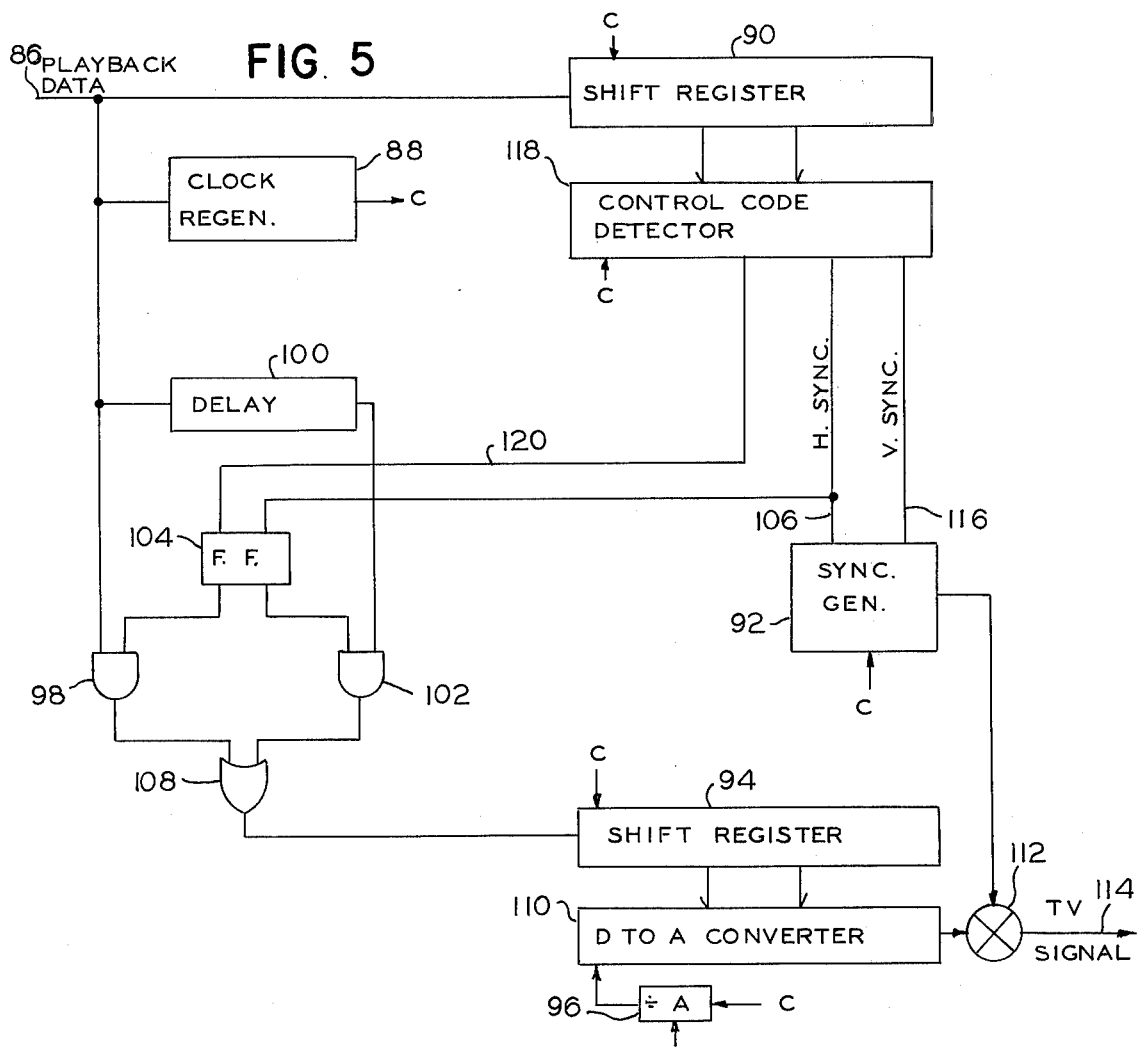
FIG. 5 is a block diagram of circuitry according to the present invention for reproducing a sampled and digitally recorded signal in analog form.

The receiving circuitry for reproducing the TV signal for playback on a TV monitor or the like is illustrated in FIG. 5. Playback data, in the form of the aforementioned digital information, is received on lead 86, which may comprise a playback output of a recorder of the type disclosed in my aforementioned U.S. Pat. No. 3,501,586, or which may comprise the output end of a transmission line. This lead is coupled to clock regenerator 88 which is synchronized to the general bit rate of the playback information for providing an output signal C coupled for synchronizing the operation of shift register 90, detector 118, sync generator 92, shift register 94 and dividing or counting circuit 96 as hereinafter more fully described. Lead 86 is also coupled to and-gate 98, and via delay means 100, having a delay equal to half the sampling interval or approximately one half word, to and-gate 102. Remaining or enabling inputs to and-gates 98 and 102 are provided by flip-flop 104 toggled from horizontal sync lead 106 so that the state of the flip-flop changes for successive horizontal lines of information received. Thus, the information words are coupled via either and-gate 98, or via delay means 100 and and-gate 102, to or-gate 108, and from the output of or-gate 108 to shift register 94 where the words corresponding to samples are successively received. When a line of video information is being received corresponding, for example, to line 24 in FIG. 2, and-gate 98 is operative for placing corresponding words in shift register 94. On the other hand, when the sampling points have been shifted and the input information is indicated as corresponding to line 26 in FIG. 2, the information passes via delay means 100 and and-gate 102 to or-gate 108 and from there to shift register 94 so the information will pass into shift register 94 at a later time delayed by half a sampling interval such that the information will be applied to the TV monitor at a later time corresponding to a desired position on the TV raster. The output of shift register 94 is applied to digital to analog converter 110 which is operated by divider or counter 96 to receive information from shift register 94 when the desired whole words reside in shift register 94. Divider or counter 96 counts down the clock C from clock regenerator 88, and is also reset from flip-flop 104 so that it will count down and produce the output enabling converter 110 at shifted times for alternate horizontal raster lines. The output of D to A converter 110 is applied to adder 112 together with the output of sync generator 92 which generates and inserts the desired synchronization pulses on the output line 114 for use with the TV video information for application to a TV monitor or the like.

Playback data is also coupled to shift register 90 coupled to control code detector 118 wherein control codes are detected, such as the code information indicated at 28, 30 and 38 in FIG. 3. The data start and end code are utilized in providing horizontal sync information on lead 106 and vertical sync information on line 116 for coupling to sync generator 92 wherein conventional television sync pulses are regenerated. The horizontal sync is employed for toggling flip-flop 104 for each horizontal line. Control code detector 118 also detects code 30 which is different for delayed and non-delayed sampled lines. For example, in the case of the non-delayed sampled line 24 in FIG. 2, a code 30 will be recognized in detector 118 and will result in an output on lead 120 for resetting flip-flop 104 in the correct phase. If properly phased, the horizontal sync signal on line 106 will be effective to toggle flip-flop 104 back and forth for successive horizontal lines. Control code detector 118 is effective in recognizing data start code information for synchronizing itself in the recognition of further codes or code words shift register 90.

Although specific circuitry is illustrated herein by way of example, it will be appreciated that other circuitry may be substituted therefor in the sampling, transmission or recording, and reproduction of samples wherein the samples are shifted back and forth on successive raster lines in a field, and are effectively shifted back and forth on the same line position in successive frames when there are an odd number of raster lines. As a result of shifting back and forth of the information, an effectively higher resolution is achieved whereby the visual appearance of the reproduction is enhanced, or whereby the same information can be transmitted or recorded with lower bandwidth capability equipment. With the comparatively low overall sampling rates, the noise integration time is also longer and hence noise is less troublesome in the reproduction of the video information.

It will be realized that means for encoding and transmitting audio information may also be included in a system of this type. One method is to transmit sound information during horizontal blanking intervals.

While digital encoding of analog samples is described according to the preferred embodiment, it is understood the shifted analog samples themselves may be recorded and/or transmitted for reproduction.

While I have shown and described a preferred embodiment of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. The method of sampling and reproducing raster information comprising a plurality of horizontal lines, said method comprising:
   sampling said raster information at many points along each horizontal line wherein the sample points are separated by a predetermined spacing, including shifting the sampling points back and forth at a rate substantially imperceptible to the eye wherein the size of the shifts is less than the spacing between sampling points, digitally encoding said samples, digitally providing code information for association with said samples indicative of whether particular information pertains to a shifted or non-shifted sampled line, and reproducing the sampled information to reconstruct a raster by locating the shifted and non-shifted information at the same relative locations in a raster as the locations where the original sampling took place.

2. The method according to claim 1 wherein the raster has an odd number of lines and said shifting is brought about by shifting sampling points for consecutive horizontal raster lines by a distance less than the spacing between samples.

3. The method according to claim 1 including recording said digitally encoded samples, said reproducing being accomplished from said recording.

4. The method of sampling and reproducing raster information which includes a plurality of successive raster lines, said method comprising:

sampling a first said line at a first plurality of points having a given normal spacing between points along said line, sampling a second said line at a second corresponding plurality of spaced points having the same normal spacing but which are shifted along said second line, relative to adjacent positions of the first plurality of points along said first line, by less than the said normal spacing between points so that said second points lie between said first points in relative position, continuing to alternate sampling of said raster information back and forth on following lines, coupling sampled information consecutively to a second location, said sampling including digitally encoding each sample for coupling to said second location in digital form and including encoding control words indicative of shifted or non-shifted sampling, consecutively receiving said sampled information for reproducing said raster at said second location including reconverting said digitally encoded samples to analog form and reproducing said raster lines from said samples by positioning information on a line corresponding to said second points adjacent locations between information on a line corresponding to said first points, and consecutively continuing said sampling and reproducing of raster information for successive rasters each of which comprise an odd number of lines whereby sampling points on corresponding lines of successive raster presentations shift back and forth between raster reproductions by one half the raster frame rate.

5. The method according to claim 4 wherein coupling sampled information includes consecutively recording said samples.

6. Apparatus for sampling and reproducing a video signal comprising:

means for periodically sampling the video information during each horizontal line of said signal including means for delaying sampling on alternate rater lines of said signal by an amount less than the spacing between samples to provide a series of first samples representing a given raster line followed by a series of delayed samples representing a following raster line, including an A-D converter for converting said samples to digital words, and means for reproducing said video signal from said samples, wherein said delayed samples are shifted relative to the non-shifted first samples because of the delay, including displaying said delayed samples in a raster line including juxtaposing said delayed samples opposite locations between said first samples in another raster line, wherein said means for reproducing said video signal provides a raster having an odd number of lines so that said alternate lines fall at different physical locations during successive frames whereby sampling points on corresponding lines of successive raster presentations shift back and forth between raster reproductions by one half the raster frame rate to increase the perceived resolution of the reproduction, said apparatus including means for encoding control words indicative of shifted or nonshifted sampling and transmitting said code words to said means for reproducing to control the same.

7. Apparatus for sampling and reproducing a video signal comprising:

means for periodically sampling the video information during each horizontal line of said signal including means for delaying sampling on alternate raster lines of said signal by an amount less than the spacing between samples to provide a series of first samples representing a given raster line followed by a series of delayed samples representing a following raster line, including an analog to digital converter for converting said samples to digital words, and means for reproducing said video signal from said samples including displaying said delayed samples in a raster line including displaying said delayed in a raster line including juxtaposing said delayed samples opposite locations between said first samples in another raster line, wherein said means for reproducing said video signal provides a raster having an odd number of a lines so that said alternate lines fall at different physical locations during successive frames whereby sampling points on corresponding lines of successive raster presentations shift back and forth between raster reproductions by one half the raster frame rate to increase the perceived resolution of the reproduction, wherein said means for periodically sampling and for delaying sampling comprises:

a controlled oscillator for operating at a digital bit rate sufficient for the generation of digital words representative of samples of said TV signal, a sync stripper for receiving said signal and adapted to provide an output indicative of horizontal synchronization pulses in said TV signal, means for dividing down the output of said controlled oscillator by a factor, N, corresponding to the number of digital bits per TV line and comparing the divided down output with the output of said sync stripper to control said oscillator in proper phase relationship, means for dividing the output of said controlled oscillator by another factor, A, equalling the number of bits in a word corresponding to a sample of said TV signal, a sampler receiving said TV signal and responsive to the output of said means for dividing by A for supplying first periodic samples of said TV signal, and means for delaying the output of said means for dividing by A and operative on alternate TV lines to control said sampler to provide second delayed samples in place of said first samples, wherein the delay is less than the spacing between samples, said analog to digital converter receiving the output of said sampler and converting the same to digital words.

8. The apparatus according to claim 7 including a flip-flop toggled on every horizontal line by the output of said means for dividing by N for changing the sampling time of said sampler, and a read only memory for adding control codes to the output of said analog to digital converter indicative of the synchronization of the TV signal and indicative of whether delayed or non-delayed samples are being taken.

9. The apparatus according to claim 8 wherein said means for reproducing said video signal comprises:

a first shift register, means for selectively delaying information received from said analog to digital converter for entry into said first shift register in delayed or non-delayed form, a second shift register for receiving the output of said analog to digital converter, a control code detector responsive to the output of said second shift register for recognizing coded information placed there by said read only memory, said control code detector being operable to control said means for selectively delaying information for entry into said first shift register, a sync generator also responsive to the output of said control code detector for generating conventional TV synchronization pulses, a digital to analog converter coupled to receive the output of said first shift register and operable for converting words in said first shift register to analog signals, and adding means for combining the output of said digital to analog converter and said sync generator to provide a reconstituted television signal.

* * * * *

UNITED STATES PATENT AND TRADEMARK OFFICE
CERTIFICATE OF CORRECTION

PATENT NO. : 4,068,265
DATED : January 10, 1978
INVENTOR(S) : JAMES T. RUSSELL

It is certified that error appears in the above-identified patent and that said Letters Patent are hereby corrected as shown below:

Column 3, line 50, "poits" should be --points--.

Column 6, line 26, after "words" insert --from--.

Column 7, line 66, "rater" should be --raster--.

Column 8, lines 40-41, after "line" (line 40), delete --including displaying said delayed samples in a raster line--.

Column 8, line 45, delete --a--, second occurrence.

Signed and Sealed this

Thirteenth Day of June 1978

[SEAL]

Attest:

RUTH C. MASON
Attesting Officer

DONALD W. BANNER
Commissioner of Patents and Trademarks